United States Patent [19]

Svensson

[11] Patent Number: 4,484,665

[45] Date of Patent: Nov. 27, 1984

[54] BRAKE ADJUSTER

[76] Inventor: Sten-Eric Svensson, Päronvägen 26, S-262 00 Ängelholm, Sweden

[21] Appl. No.: 396,906

[22] PCT Filed: Nov. 26, 1981

[86] PCT No.: PCT/SE81/00344
§ 371 Date: Jul. 7, 1982
§ 102(e) Date: Jul. 7, 1982

[87] PCT Pub. No.: WO82/01922
PCT Pub. Date: Jun. 10, 1982

[30] Foreign Application Priority Data

Nov. 26, 1980 [SE] Sweden .............................. 8008257

[51] Int. Cl.³ ............................................ F16D 65/56
[52] U.S. Cl. ........................ 188/79.5 K; 188/196 BA
[58] Field of Search ................. 188/79.5 R, 79.5 K, 188/79.5 GC, 196 P, 196 BA, 196 R

[56] References Cited

U.S. PATENT DOCUMENTS

| 3,342,293 | 9/1967 | Hildebrand et al. | 188/79.5 K X |
| 3,428,154 | 11/1969 | Lodjic et al. | 188/196 |
| 3,921,765 | 11/1975 | Swander | 188/79.5 K |
| 4,384,638 | 5/1983 | Crissy et al. | 188/79.5 K |

FOREIGN PATENT DOCUMENTS 1902798 8/1970 Fed. Rep. of Germany ..... 188/79.5 K
7910263 9/1981 Sweden .

OTHER PUBLICATIONS

"Industriell Teknik", No. 9, issued 1974, (Stockholm), Patentprofylax 34/74, p. 73.

Primary Examiner—Duane A. Reger
Attorney, Agent, or Firm—Shapiro and Shapiro

[57] ABSTRACT

A brake adjuster for the automatic adjustment of vehicle brakes has a lever (13) which is connected to a brake cylinder (2) via a piston rod (1) and which, via a slack adjuster (15), is connected to a cam shaft (4) having a brake key (5) for brake application. The slack adjuster (15) cooperates via a one-way clutch (20) and a motion transmitter (28) with a control disc (39) fixedly attached to a bearing housing (9) for the cam shaft (4). The motion transmitter (28) is formed by a worm wheel (27) which, via said one-way clutch (20), is connected to said slack adjuster (15), and a worm (29) meshing with the worm wheel. The worm (29) is axially movable against the action of a spring (34) upon brake application and is non-rotatably connected to a pinion (31) which is connected to the control disc (39) to transfer the movement thereof, relative to the lever (13), to the worm (29).

8 Claims, 7 Drawing Figures

BRAKE ADJUSTER

This invention relates to an adjuster for the automatic adjustment of vehicle brakes, said adjuster having a lever connected to an actuator and, via slack adjusting means, to drive means for brake application, said slack adjusting means cooperating, via a one-way clutch and motion transmitting means, with control means fixedly attached to a stationary part of the vehicle, said motion transmitting means comprising a worm wheel connected to said slack adjusting means via said one-way clutch, and a worm engaging said worm wheel and non-rotatably connected to a drive member attached to said control means for transmitting to said worm the movement of said control means relative to said lever.

The adjuster is of the brake adjuster type which is slow-acting and effects adjustment only upon excessive clearance between the brake lining and the brake drum. The adjuster is based upon the clearance sensing principle, which means that the adjuster mechanism is to sense the clearance and not the piston stroke of the actuator which is in the form of a brake cylinder. Thus, the adjuster is not intended to compensate for that part of the piston stroke which represents the elasticity in the brake system.

A brake adjuster operating in accordance with the clearance sensing principle normally has two clutches, viz. a one-way clutch and a torque limiting clutch.

A further feature of the adjuster according to the invention is that it is sufficiently quick-acting to be able to compensate for brake lining wear, but still is sufficiently slow-acting to be unable to compensate for thermal expansion of the brake drum.

The object of the present invention is to provide a brake adjustor of the above-mentioned construction which, in contrast to prior art adjusters of the same type, effects adjustment during the brake application stroke instead of during the return stroke. To be sure, the return stroke is smoother and more readily controlled, which is an advantage, but on the other hand it it not unusual that the return springs of the brakes are inadequate to be able both to release the brake and, at the same time, to effect adjustment. An adjuster which adjusts during the return stroke besides is highly sensitive to deformation of the tooth profile of the main gear included therein.

The object of the invention is realized in that, during brake application, the worm of the motion transmitting means, which engages the worm gear, is axially movable against the action of a resilient force.

According to an important feature of the invention, the worm is axially movably mounted in a cross bore in the lever, the resilient force being exerted by a spring, and the driven member being a pinion with teeth meshing with the teeth of the control means.

According to a preferred development of the invention, the worm is non-rotatably and axially movably connected to the pinion via a dog, thereby to make it possible for the worm to rotate the pinion and to be axially movable at the same time.

In a brake adjuster where the drive means in per se known manner is formed by a cam shaft which at one end is connected to the slack adjusting means and at its other end carries a brake key for brake application, the cam shaft being mounted in a bearing housing which constitutes the said stationary part of the vehicle, the arrangement in such, according to a further important feature of the invention, that the control means is in the form of an essentially planar disc fixedly attached to said bearing housing by engagement means permitting said disc to be positioned in any angular position relative to said bearing housing.

In conventional brake adjusters, the control means is a control arm instead of a planar disc, and this arm must be fixed with great accuracy in a given position and according to a specific pattern during installation. One could say that the brake adjuster according to the invention, because of its construction, has a self-adaptive clearance which corresponds to the normal clearance between the brake lining and the brake drum and which, in professional circles, is known as the C part. In other words, this clearance always finds its correct position.

To be able simply and efficiently to position the disc in any angular position relative to the bearing housing, the engagement means are in the form of projecting lugs on the disc engaging corresponding recesses in the bearing housing.

The brake adjuster is readily adapted to different vehicle types in that the locating points which are required for conventional brake adjusters and which are susceptible to shocks and made to measure for each vehicle type, have been entirely eliminated. More particularly, the one-way clutch, according to a preferred embodiment of the invention, is connected to the slack adjusting means via a mechanism which, upon installation of the brake adjuster in the vehicle, can be set to a basic clearance suitable for the vehicle type or brake construction concerned.

This basic adjusting mechanism preferably is in the form of a dog that can be mounted in several different positions on the brake adjusting means and moved into engagement with the one-way clutch with a clearance which is proportional to the position of the dog on the slack adjusting means and which constitutes the basic clearance.

The brake adjuster is symmetrical about a longitudinal centre axis, whereby the adjuster upon assembly can be readily modified for mounting on the left or right hand side of the vehicle so that the control disc will always be facing the bearing housing of the cam shaft. In respect of its construction details, the brake adjuster thus is the same in its left and right hand embodiments, the resilient force against the worm being directed in the same sense in both embodiments.

The invention will be described in more detail in the following, reference being had to the accompanying drawings which illustrate a preferred embodiment. In the drawings.

Figure 1:
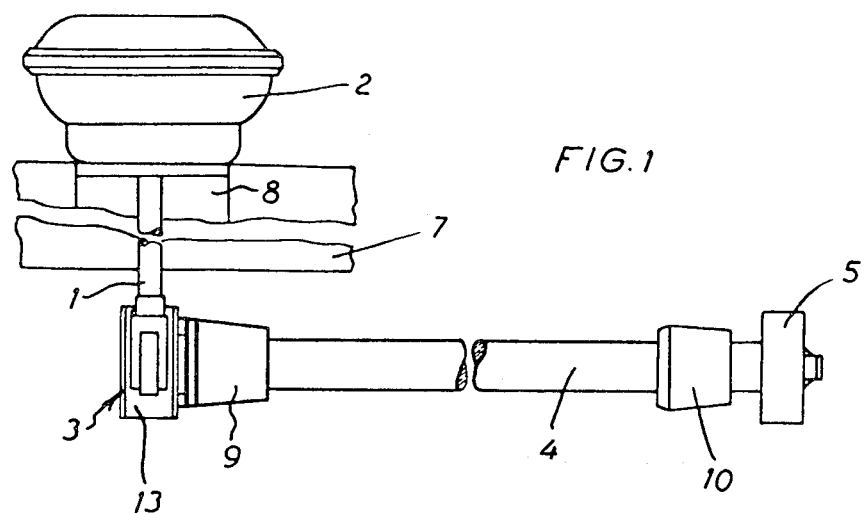
FIG. 1 shows diagrammatically from above the basic construction of a brake operating mechanism comprising the adjuster according to the invention.
Figure 2:
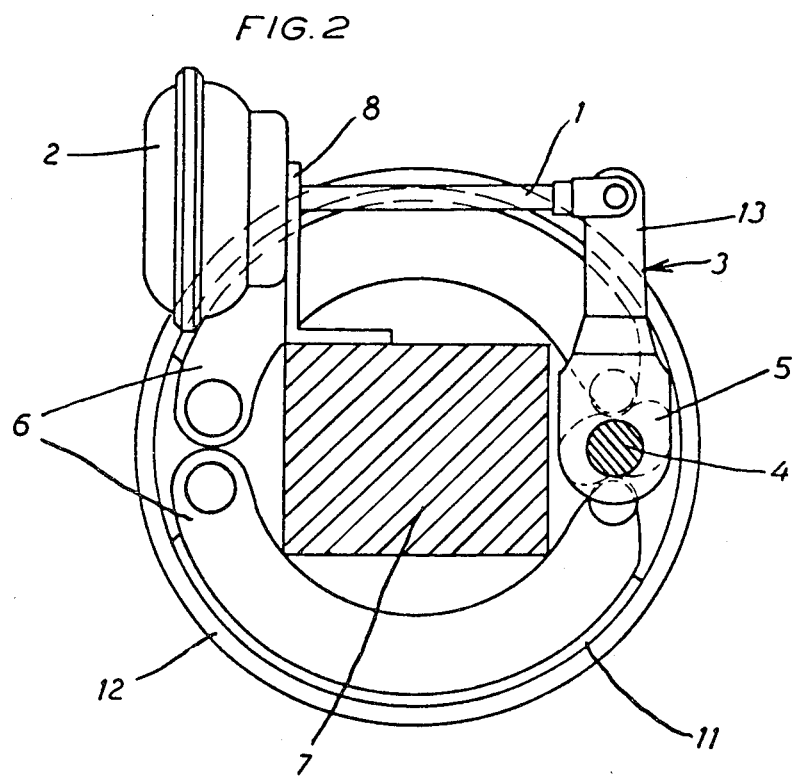
FIG. 2 is a lateral view of the mechanism according to FIG. 1, more particularly from the left-hand side.

The brake operating as shown in FIGS. 1 and 2 comprises a piston rod 1 of an actuator in the form of a conventional brake cylinder 2, a brake adjuster 3 between the piston rod 1 and one end of a cam shaft 4, the other end of which carries a brake key of S cam 5 which is positioned between two conventional brake shoes 6. The brake cylinder 2 may be mounted on the vehicle in several different ways, but in the embodiment illustrated is mounted on an axle case 7 via a bracket 8. Adjacent the brake adjuster 3, the cam shaft 4 is mounted in a bearing housing 9 which, in turn, if fixdly mounted on the vehicle. At its other end, the cam shaft 4 is mounted in a bearing housing 10 secured to a brake anchor plate or the like (not shown). The movement of the piston rod 1 upon brake application, i.e. upon activation of the brake cylinder 2, causes the brake adjuster 3 to rotate together with the cam shaft 4 so that the S cam 5 is rotated and thus urges the brake linings 11 of the brake shoes 6 into braking frictional engagement with the inside of the brake drum 12.

Figure 3:
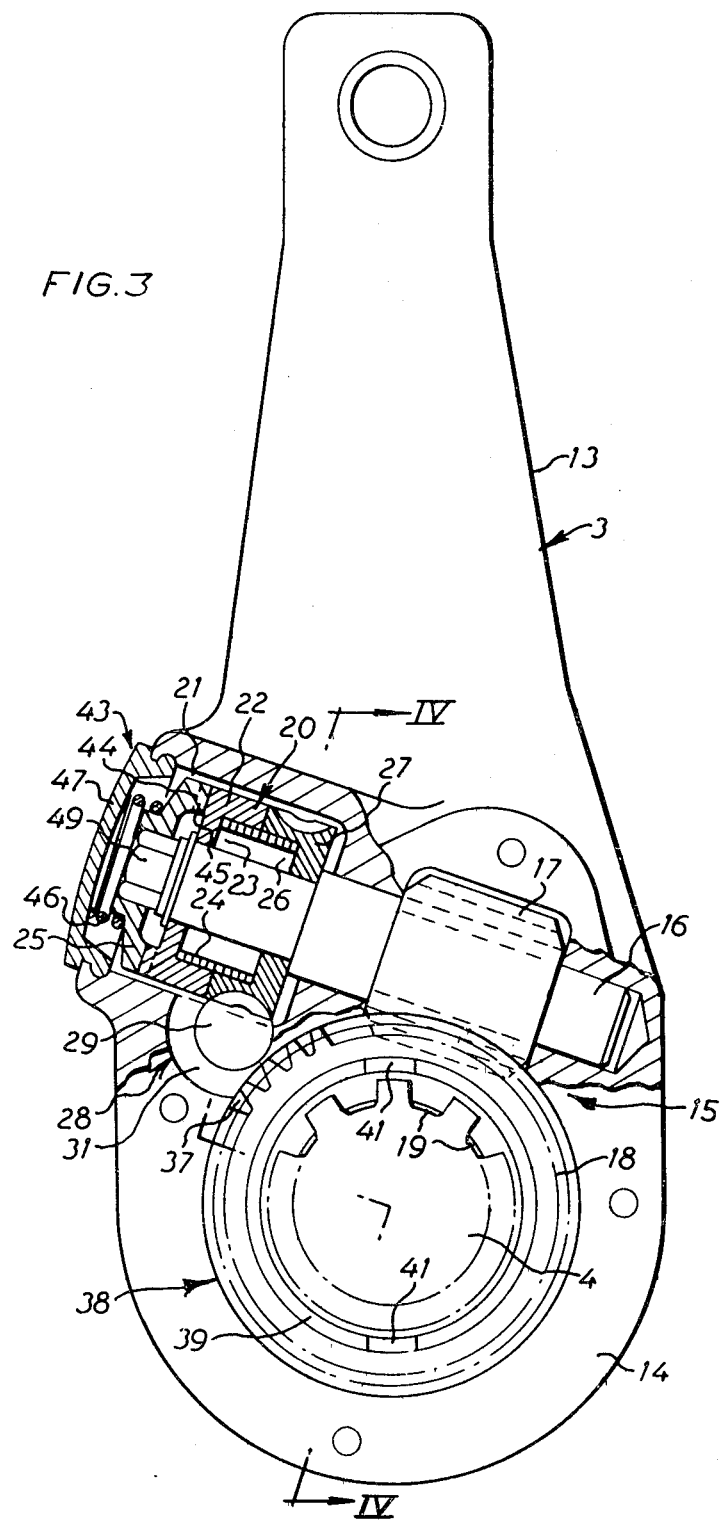
FIG. 3 is a lateral view of the adjuster according to the invention, with a portion broken away to show interior details.
Figure 4:
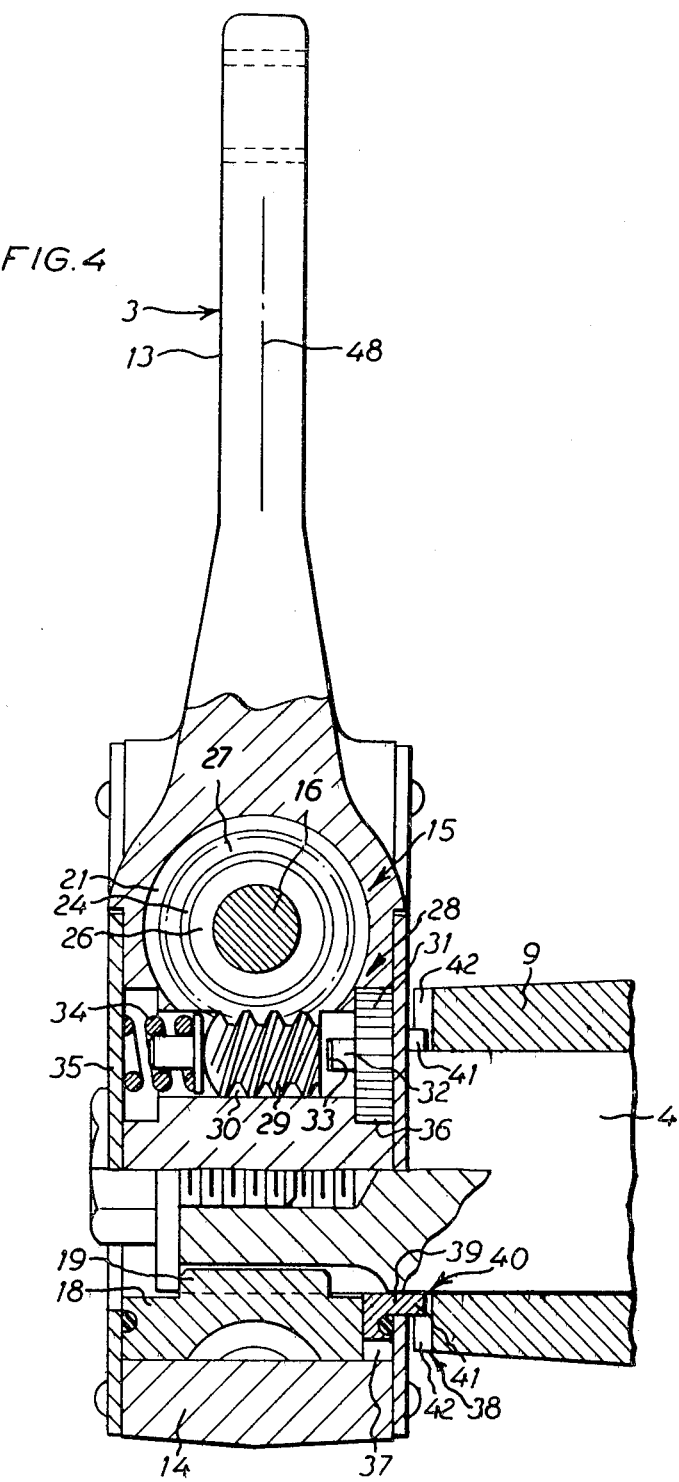
FIG. 4 is a section along line IV-IV in FIG. 3.
Figure 5:
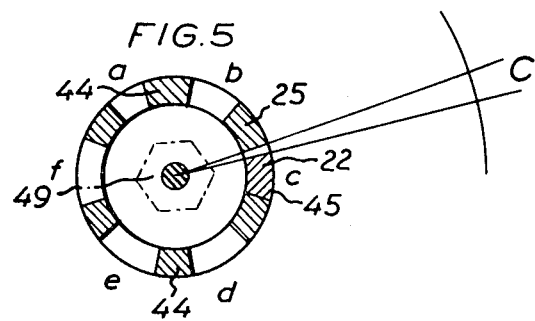
FIG. 5 is a detail view illustrating the components of a basic adjusting mechanism.

The brake adjuster 3 shown in FIGS. 3–5 has a lever 13 pivotally connected at one end to the piston rod 1 of the brake cylinder 2, the other end of said lever being formed as a housing 14 for accommodating components.

Among these components is a slack adjusting means 15 which comprises a worm screw 17 non-rotatably mounted on or formed integrally with a worm shaft 16 mounted in the housing 14, said worm screw 17 engaging a worm wheel 18 which also is mounted in the housing 14 and which has internal splines 19 engaging external splines (not shown) on the cam shaft 4.

At its end opposite the worm screw 17, the worm shaft 16 of the slack adjusting means 15 is connected to a one-way clutch 20 disposed in a recess 21 in the housing 14. The one-way clutch 20 comprises a clutch ring 22 having a stepped bore 23 within which a portion, in the embodiment illustrated about half, of a retaining spring 24 is disposed. For a purpose described in more detail below, the clutch ring 22 is connected to a dog 25 for basic setting of the brake adjuster clearance. The remainder of the retaining spring 24 is disposed in a stepped bore 26 in a worm wheel 27 forming part of a motion transmitting means 28, the worm wheel 27 of which engages a worm 29 which is axially movably mounted in a bore 30 in the housing 14. The worm 29 is non-rotatably connected to a drive member 31 in the form of a pinion, the worm 29 being non-rotatably and axially movably connected to said pinion 31 via a dog 32 which preferably is in the form of a transverse projection slidably engaging a transverse groove 33 in an end portion of the worm 29, as shown in FIG. 4. The worm 29 is axially movable against the action of a pressure spring 34 acting between the worm and an end plate 35 on the housing 14; see FIG. 4.

The pinion 31 is provided with external teeth 36 meshing with external teeth 37 on a control means 38 in the form of an essentially planar disc 39. The disc is fixedly attached to the bearing housing 9 by means of engagement means 40 permitting the disc to be located in any angular position relative to the bearing housing. In the embodiment illustrated, the engagement means 40 are in the form of projecting lugs 41 on the disc 39 engaging corresponding recesses 42 in the bearing housing 9.

As has been mentioned before, the one-way clutch 20 is connected to the slack adjusting means 15 via a mechanism 43 which, upon installation of the brake adjuster 3 in the vehicle, can be set to a basic clearance C suitable for the brake construction concerned. This basic setting mechanism is formed by the dog 25 previously referred to. The dog can be mounted in several different positions, in the embodiment illustrated in six different positions a-f, on the slack adjusting means 15 and is movable into engagement with the one-way clutch 20 through the basic clearance C which is proportional to the position of the dog 25 on the slack adjusting means 15; see FIG. 5. More particularly, the dog 25 has a number of teeth 44 defining tooth spaces or the positions a-f. Meshing with one of these spaces is a tooth 45 on the clutch ring 22. The clearance C between the tooth 45 and the tooth profile of the adjacent tooth 44 increases gradually for the different positions so that the brake adjuster 3, upon installation in the vehicle, can be adjusted until it gives the clearance best suited for the brake construction concerned. To maintain the dog 25 in the set position, there is provided a pressure spring 46 which acts between the dog 25 and a cover 47 removably mounted on the housing 14 and covering the recess 21. The dog 25, the pressure spring 46 and the cover 47 can form an integral unit.

Figure 6:
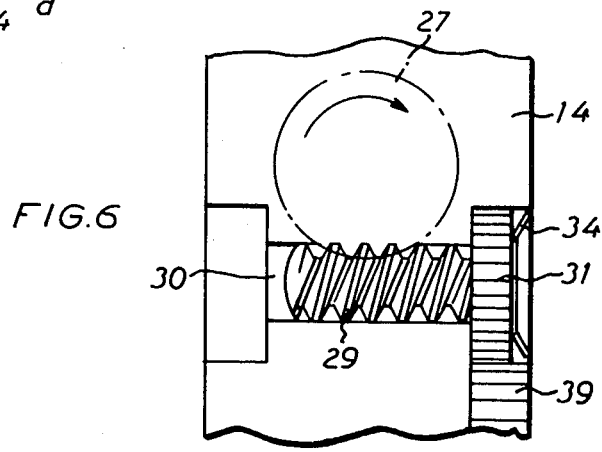
FIGS. 6 and 7 illustrate diagrammatically a possibility of making the brake adjuster operate in exactly the same manner, independently of whether is it designed for left-hand or for right-hand mounting.
Figure 7:
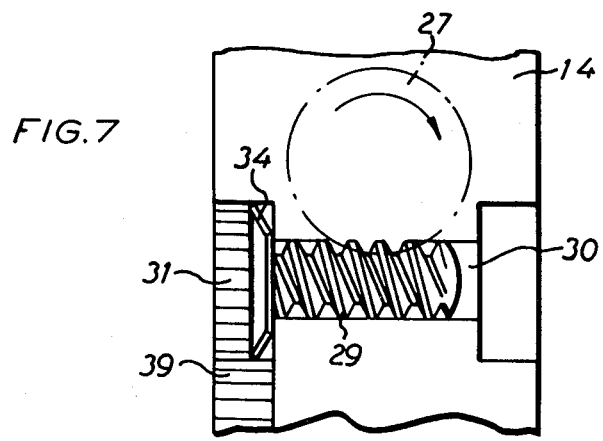

As will appear from FIG. 4, the adjuster is symmetrical about a longitudinal centre axis 48 so that the brake adjuster, during assembly thereof, can be adapted in a simple manner for mounting on the left-hand or right-hand side of the vehicle so that the control disc 39 will always be facing the adjacent bearing housing 9 of the cam shaft 4. The right-hand design of the brake adjuster thus is the mirror image of the left-hand design. The only thing one has to do is to turn the control disc 39 and the worm wheel 18 through 180° and to let them change places, while the worm 29 is inserted from the other side. In spite of the fact that the construction details have been turned around and changed places, all movements will be in the right direction, the brake adjuster 3 will retain its symmetry, and the function will be identical. This is illustrated in FIGS. 6 and 7 which show part of the brake adjuster in the right-hand and left-hand design. It will be seen that the pressure spring 34 which here is in the form of a cup spring, has been moved in such a way that the spring force so to speak changes sign.

The brake adjuster 3 as described above and illustrated in the drawings operates as follows.

Upon brake application, the brake adjuster 3 rotates under the action of the piston rod 1 of the brake cylinder 2 together with the cam shaft 4 about the cam shaft centre. The control disc 39, because it is provided with lugs 41 extending into the corresponding recesses 42 in the adjacent bearing housing 9 of the cam shaft 4, does not participate in the rotational movement. Via the pinion 31 and the dog 32, the relative movement which occurs between the control disc 39 and the lever 13 forces the worm 29 to rotate. The movement of the worm 29 is transferred to the worm wheel 27 which, via the retaining spring 24, rotates the clutch ring 22. From the worm wheel 27, the rotational movement, after passing the clearance C between the clutch ring 22 and the dog 25, is transferred via said dog 25 to the worm shaft 16 and the worm screw 17 which, in turn, rotates the worm wheel 18 and thus the cam shaft 4 and the S cam 5, whereupon slack adjustment occurs (the clearance between the brake linings 11 and the brake drum 12 is reduced). The slack adjustment continues until the linings 11 engage the brake drum 12, when the torque in the brake adjuster suddenly is increased. The brake adjuster interrupts the slack adjustment during brake application the instant the brake linings 11 engage the brake drum 12 in that the motion transmitting means 28 which consists of the worm wheel 27 and the worm 29 has been made torque-dependent. This means that the worm 29 no longer transfers the movement to the worm wheel 27 but is instead moved axially against the action of the pressure spring 34. This is made possible because the pinion 31, by the construction of the dog 32, has been separated from the worm 29. The force of the pressure spring 34 must be so adapted that the axial movement of the worm 29 does not start until the brake linings 11 engage the brake drum 12.

Upon release of the brake, the direction of rotation of the worm 27 which initially moves back axially to the starting position, is changed. After that, the worm 29 actuates the worm wheel 27 and rotates it until the brake is in its release position. The movement is transferred only as far as to the worm wheel 27 since the retaining spring 24 in the one-way clutch 20 slips in this direction.

The excessive clearance has now been somewhat reduced during the braking cycle described but, because of the slow action of the brake adjuster, a further number of braking cycles are required before the clearance is reduced to the C value.

Because the brake adjuster operates continuously and because the degree of adjustment for each brake application depends upon the amount by which the clearance is too large, the brake adjuster has an asymptotic take-in curve, which means that the clearance asymptotically approaches the predetermined value.

Naturally, the brake adjuster may also be operated by hand, for instance after an exchange of brake linings 11. For such manual adjustment, the cover 47, the pressure spring 46 and the dog 25 are dismantled so that the hexagon head 49 of the worm shaft 16 is exposed to permit application of an adjustment tool. During manual adjustment, no friction clutch need be overcome.

Naturally, the invention is not restricted to the embodiment described above and illustrated in the drawings, but may be modified in different ways within the scope of the appended claims.

I claim:

1. Adjuster for the automatic adjustment of vehicle brakes, said adjuster (3) having a lever (13) connected to an actuator (2, 1) and, via slack adjusting means (15), to drive means (4, 5) for brake application, said slack adjusting means (15) cooperating, via a one-way clutch (20) and motion transmitting means (28), with control means (38) fixedly attached to a stationary part (9) of the vehicle, said motion transmitting means (28) comprising a worm wheel (27) connected to said slack adjusting means (15) via said one-way clutch (20), and a worm (29) engaging said worm wheel and non-rotatably connected to a drive member (31) attached to said control means (38) for transmitting to said worm (29) the movement of said control means relative to said lever (13), characterized in that, during brake application, the worm (29) of the motion transmitting means (28), which engages the worm wheel (27), is axially movable against the action of a resilient force.

2. A brake adjuster as claimed in claim 1, characterized in that the worm (29) is axially movably mounted in a cross bore (30) in the lever (13), that the resilient force is exerted by a spring (34), and that the drive member is a pinion (31) with teeth (36) meshing with teeth (37) of the control means (38).

3. A brake adjuster as claimed in claim 2, characterized in that the worm (29) is non-rotatably and axially movably connected to the pinion (31) via a dog (32).

4. A brake adjuster as claimed in claim 1, in which the drive means is formed by a cam shaft (4) which at one end is connected to the slack adjusting means (15) and at its other end carries a brake key (5) for brake application, the cam shaft (4) being mounted in a bearing housing (9) which constitutes the said stationary part of the vehicle, characterized in that the control means (38) is in the form of an essentially planar disc (39) fixedly attached to said bearing housing (9) by engagement means (40) permitting said disc to be positioned in any angular position relative to said bearing housing.

5. A brake adjuster as claimed in claim 4, characterized in that the engagement means (40) are in the form of projecting lugs (41) on the disc (39) engaging corresponding recesses (42) in the bearing housing (9).

6. A brake adjuster as claimed in claim 1, characterized in that the one-way clutch (20) is connected to the slack adjusting means (15) via a mechanism (43) which, upon installation of the brake adjuster (3) in the vehicle, can be set to a basic clearance (C) suitable for the vehicle type or brake construction concerned.

7. A brake adjuster as claimed in claim 6, characterized in that the basic adjusting mechanism (43) is in the form of a dog (25) that can be mounted in several different positions (a-f) on the slack adjusting means (15) and moved into engagement with the one-way clutch (20) with a clearance (C) which is proportional to the position of the dog on the slack adjusting means and which constitutes the basic clearance.

8. A brake adjuster as claimed in claim 1, said adjuster being symmetric about its longitudinal axis for adaptation to left-hand and right-hand embodiments, with the resilient force against said worm (29) being directed in the same sense in both embodiments.

* * * * *